(12) United States Patent
Hodgson et al.

(10) Patent No.: US 9,127,583 B2
(45) Date of Patent: Sep. 8, 2015

(54) DEVICE FOR PROVIDING A LIQUID REDUCING AGENT AND MOTOR VEHICLE HAVING THE DEVICE

(75) Inventors: Jan Hodgson, Troisdorf (DE); Sven Schepers, Troisdorf (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 45 days.

(21) Appl. No.: 13/548,411

(22) Filed: Jul. 13, 2012

(65) Prior Publication Data

US 2012/0311999 A1    Dec. 13, 2012

Related U.S. Application Data

(63) Continuation of application No. PCT/EP2010/063824, filed on Sep. 20, 2010.

(30) Foreign Application Priority Data

Jan. 13, 2010  (DE) .......................... 10 2010 004 614

(51) Int. Cl.
*F01N 3/00* (2006.01)
*F01N 3/20* (2006.01)

(52) U.S. Cl.
CPC ............ *F01N 3/2066* (2013.01); *F01N 2610/02* (2013.01); *F01N 2610/10* (2013.01); *F01N 2610/1406* (2013.01); *F01N 2610/1433* (2013.01); *Y02T 10/24* (2013.01)

(58) Field of Classification Search
CPC .............. F01N 3/2066; F01N 2610/02; F01N 2610/10; F01N 2610/1406; F01N 2610/1433; F01N 2610/1466; F01N 2610/1486; F01N 3/206; Y02T 10/24; F03B 11/00
USPC ........ 60/274–303, 317; 137/15.04, 565.01, 1, 137/544; 220/562; 422/168, 169, 174
See application file for complete search history.

(56) References Cited

U.S. PATENT DOCUMENTS 7,481,049 B2    1/2009  Huber et al.
2007/0157602 A1    7/2007  Gschwind
(Continued)

FOREIGN PATENT DOCUMENTS

DE    102005046029    *  3/2007
DE    102005046029 A1 *  3/2007
(Continued)

OTHER PUBLICATIONS

International Search Report of PCT/EP2010/063824.

*Primary Examiner* — Thomas Denion
*Assistant Examiner* — Kelsey Stanek
(74) *Attorney, Agent, or Firm* — Laurence A. Greenberg; Werner H. Stemer; Ralph E. Locher (57) ABSTRACT

A device for providing a liquid reducing agent includes a reducing agent tank for storing a reducing agent. The reducing agent tank has a tank bottom including a separate chamber. A dosing or metering unit extracts reducing agent from the reducing agent tank at an extraction point disposed at the separate chamber. The dosing unit is disposed within the separate chamber. A motor vehicle having the device is also provided.

18 Claims, 5 Drawing Sheets

(56) References Cited

U.S. PATENT DOCUMENTS

| | | |
|---|---|---|
| 2009/0007527 A1 | 1/2009 | Mitsudou |
| 2009/0065508 A1 | 3/2009 | Haeberer et al. |
| 2009/0127265 A1* | 5/2009 | Magnusson et al. ......... 220/564 |
| 2009/0189417 A1* | 7/2009 | Wolkersdorfer ............. 296/209 |
| 2009/0230136 A1 | 9/2009 | Dougnier et al. |
| 2009/0277156 A1* | 11/2009 | Hodgson et al. ............... 60/274 |
| 2011/0005210 A1* | 1/2011 | Erdmann et al. ............... 60/295 |

FOREIGN PATENT DOCUMENTS

| | | | |
|---|---|---|---|
| DE | 102008031052 | * | 1/2009 |
| DE | 102008031052 A1 | * | 1/2009 |
| EP | 1 925 354 A1 | | 5/2008 |
| EP | 1925354 | * | 5/2008 |
| EP | 1925354 A1 | * | 5/2008 |
| JP | H11247677 A | | 9/1999 |
| JP | 2000297713 A | | 10/2000 |
| JP | 2008162334 A | | 7/2008 |
| JP | 2009508053 A | | 2/2009 |
| JP | 2009144644 A | | 7/2009 |
| JP | 2009243331 A | | 10/2009 |
| JP | 2009540184 A | | 11/2009 |
| KR | 100859427 B1 | | 9/2008 |
| WO | 0225075 A1 | | 3/2002 |
| WO | 2006134641 A1 | | 12/2006 |
| WO | 2008043928 A1 | | 4/2008 |
| WO | WO 2009007405 A1 | * | 1/2009 |

* cited by examiner

DEVICE FOR PROVIDING A LIQUID REDUCING AGENT AND MOTOR VEHICLE HAVING THE DEVICE

CROSS-REFERENCE TO RELATED APPLICATION

This is a continuation, under 35 U.S.C. §120, of copending International Application No. PCT/EP2010/063824, filed Sep. 20, 2010, which designated the United States; this application also claims the priority, under 35 U.S.C. §119, of German Patent Application DE 10 2010 004 614.0, filed Jan. 13, 2010; the prior applications are herewith incorporated by reference in their entirety.

BACKGROUND OF THE INVENTION

Field of the Invention

The invention relates to a device having a tank configuration with a metering or dosing system for a reducing agent. A reducing agent for the selective catalytic reduction of exhaust-gas constituents in the exhaust gas of an internal combustion engine can be provided at a defined or predefined pressure by using such a configuration. The reducing agent provided at a desired pressure may be supplied, for example, by an injector to an exhaust-gas treatment system. The invention also relates to a motor vehicle having the device.

The proliferation of motor vehicles with lean-burn internal combustion engines has increased significantly. Lean-burn internal combustion engines operate with an air/fuel ratio in which more air is supplied to the internal combustion engine than is required for the combustion of the simultaneously supplied fuel. The air/fuel ratio is normally described by the so-called lambda value. Lean air/fuel ratios correspond to a lambda value of greater than the stoichiometric ratio of 1.0. Such lean-burn internal combustion engines are distinguished by fuel consumption advantages. Those are, however, in part associated with considerably increased emissions of nitrogen oxide compounds ($NO_x$) in the exhaust gas. The nitrogen oxide compounds can only be eliminated to a certain extent through the use of engine-internal measures.

The method of selective catalytic reduction was developed for that reason. In the case of selective catalytic reduction (SCR), a reducing agent or a reducing agent precursor is supplied to the exhaust gas in an exhaust-gas treatment device. Reducing agent precursors are generally also referred to as reducing agent. Ammonia or the like, for example, is used as a reducing agent. Urea and/or a urea-water solution, for example, is used as a reducing agent precursor. An already proven reducing agent precursor is a 32.5% urea-water solution which is available under the trade name AdBlue. Such reducing agent precursors are then converted in the exhaust system, and/or in an interposed evaporator unit and/or hydrolysis unit, to form the actual reducing agent. A urea-water solution is typically converted to form ammonia. In a suitable catalytic converter, nitrogen oxide compounds in the exhaust gas can then be converted together with the ammonia into non-harmful constituents such as nitrogen, water and carbon dioxide.

A dedicated storage system and/or dosing system for the provision of reducing agent is generally provided in the motor vehicle. Such a system may entail considerable costs. Furthermore, with regard to the storage of liquid reducing agent and in particular the storage of AdBlue, it is a problem that it freezes at low temperatures. AdBlue freezes at approximately −11° C. A system for storing such reducing agent must therefore be constructed to be able to withstand freezing.

Furthermore, reliable fill level determination in the tank for the reducing agent should be possible. That is particularly important because, for applications in passenger motor vehicles, it is often desirable not to have to replenish the reducing agent in the tank during regular operation, but rather for filling of the reducing agent tank to be carried out (only) during regular inspections of the passenger motor vehicle. For that reason, it should also be possible for a reducing agent tank to be evacuated as completely as possible during operation, in such a way that there is no remaining residual volume of reducing agent in the reducing agent tank which cannot be delivered by the dosing or metering unit.

SUMMARY OF THE INVENTION

It is accordingly an object of the invention to provide a device for providing a liquid reducing agent and a motor vehicle having the device, which overcome the hereinafore-mentioned disadvantages and at least partially solve the highlighted problems of the heretofore-known devices and vehicles of this general type. In particular, it is sought to disclose a device for providing liquid reducing agent, which is particularly inexpensive and/or permits precise filling level determination and as complete as possible an evacuation of a reducing agent tank during operation.

With the foregoing and other objects in view there is provided, in accordance with the invention, a device for providing liquid reducing agent. The device comprises a reducing agent tank configured to store liquid reducing agent. The reducing agent tank has a tank bottom and the tank bottom has a separate chamber with an extraction point disposed at the separate chamber or at the tank bottom. A dosing unit is disposed within the separate chamber and is configured to extract the reducing agent from the reducing agent tank at the extraction point.

In accordance with another feature of the invention, the separate chamber is preferably disposed in the tank bottom. The separate chamber is particularly preferably disposed in a lateral tank wall in the vicinity of the tank bottom. It is, however, also possible for the separate chamber to be provided in the tank wall at some other position of the tank wall, for example on the upper side of the tank.

The basic concept of the invention proposed herein is that of providing the dosing unit in a chamber in or on the tank bottom of the reducing agent tank. A "separate" chamber is, in particular, a subvolume which extends from the chamber wall or from the tank bottom in the direction of the tank interior and which is not filled with reducing agent, that is to say a (discrete) indentation, concavity or the like. In this case, a part of the wall of the chamber may be formed in one piece with the reducing agent tank or with the tank wall and, in particular, with the tank bottom, with the wall thus, in particular, providing a separation with respect to the reducing agent. It is nevertheless also possible, if appropriate, for the chamber to be formed by a separate housing which is disposed on or in the tank wall or the tank bottom. In this case, the extraction of the reducing agent from the reducing agent tank should take place at the chamber and, in particular, especially close to the tank bottom, because it is there that reducing agent is also available in the case of different fill levels in the reducing agent tank, in particular in the case of low fill levels. The device according to the invention, in particular, does not have an extraction pipe which extends from the top side of the reducing agent tank to the tank bottom and through which reducing agent is suctioned. The extraction of the reducing agent from the reducing agent tank takes place directly in the vicinity of the separate chamber and/or in the vicinity of the dosing unit. In the case of a dosing unit disposed on the tank bottom, a determination of the fill level in the reducing agent tank can be carried out through the use of a sensor and, in particular, a pressure sensor which is provided on the separate chamber or in the dosing unit.

The elimination of an extraction pipe extending to the upper tank cover is firstly advantageous because costs are saved in this way. Furthermore, a negative pressure is generally required to suction the reducing agent through an extraction pipe of that type. Building up a negative pressure may, under certain operating conditions, be problematic for a pump which is used in a dosing system for reducing agent. Piston pumps or diaphragm pumps are typically used. The need to build up a negative pressure is eliminated by the configuration of the dosing system in a chamber in the tank bottom according to the invention.

In accordance with a further feature of the invention, the dosing unit is detachably connected to the reducing agent tank. The dosing unit can thus be exchanged independently of the reducing agent tank. As already stated, the dosing unit generally has components such as pumps, valves, pressure sensors, temperature sensors and filters, which have a considerably shorter service life than the reducing agent tank. For this reason, it is advantageous for the dosing unit to be detachable from the reducing agent tank. It is preferable for a corresponding (sealed) valve configuration to be provided at the fluidic connecting point between the reducing agent tank and the dosing unit. The valve configuration has the effect that the reducing agent cannot escape in an uncontrolled manner from the reducing agent tank when the dosing unit is dismounted. This is advantageous, in particular, because the dosing unit is mounted on the bottom of the reducing agent tank. Furthermore, the reducing agent tank is generally installed in a motor vehicle in such a way that it cannot be dismounted from the motor vehicle without a relatively great amount of assembly outlay. In this case, it is advantageous for the dosing unit to be disposed in the tank bottom of the reducing agent tank in such a way that it is accessible even without the need for the reducing agent tank to be completely dismounted.

In accordance with an added feature of the invention, the dosing unit has at least one component from the group including the following components:

pump;
filter;
pressure sensor;
temperature sensor; and
valve.

The dosing unit preferably includes all of the components necessary for being able to provide the reducing agent at a defined pressure, or at any rate at least a pump. The components may also include further pumps, valves, pressure sensors, temperature sensors and/or filters as well as electronic components, connecting lines, etc.

The individual components are preferably mounted on a base plate. The base plate is preferably metallic. The base plate may, for example, be produced from high-grade steel or aluminum. At least one duct, with which the individual components for transporting or delivering reducing agent are connected to one another, may be provided or integrated in the base plate. The ducts (disposed in series or parallel) may, for example, be provided in the manner of a bore in the base plate. The base plate may also be produced as a cast part already including such ducts. The base plate can distribute heat between the individual components of the device according to the invention in an effective manner. Aluminum is therefore a particularly advantageous material for the base plate. Aluminum has a very good ratio of thermal conductivity to weight.

In accordance with an additional feature of the invention, the separate chamber can be closed off with respect to the environment by a cover, and the dosing unit is fastened to the cover. It is particularly preferable in this connection for the top side of the separate chamber to be integrally connected to the tank bottom. In particular, the top side of the separate chamber and the tank bottom are produced from a continuous starting material. The top side of the separate chamber may, for example, be stamped into the tank bottom. In this case, the top side of the chamber constitutes the actual wall of the tank bottom. A fastening structure to which the cover can be fastened may be provided in the region of the transition from the separate chamber to the rest of the tank bottom. The fastening structure for the cover preferably has at least one screw connection or a sealing surface, wherein the cover can be screwed to the screw connection and, in particular, forms with the sealing surface a connection which is sealed with regard to the (liquid) reducing agent. The fastening structure may be integrally formed by stamping during the production of the tank bottom. It is also possible for the fastening structure to be cast, welded and/or bonded on. The dosing unit with its components already described further above may be fully (pre-) mounted on the cover in such a way that it, together with the cover, can be very easily installed into the separate chamber and dismounted therefrom again. The individual components of the dosing unit are immediately accessible when the cover is detached.

Lesser demands are placed on the leak-tightness of the interior space of the separate chamber to the outside than on the leak-tightness of the reducing agent tank itself. The seal of the interior of the chamber to the outside generally does not come into direct contact with the liquid reducing agent, but rather must merely prevent spray water from passing into the interior of the chamber from the outside. It is thus possible for a significantly less sturdy seal to be provided for sealing off the separate chamber to the outside than for sealing off the reducing agent tank to the outside or with respect to the separate chamber.

In accordance with yet another feature of the invention, it is furthermore considered to be advantageous for the separate chamber to be removable from the tank bottom. The separate chamber can preferably be removed completely from the tank bottom. In this case, the tank bottom has, without the separate chamber, (only) one opening into which the separate chamber as a whole can be inserted. The opening in the tank bottom should be formed with a screw connection and/or a sealing surface in order to ensure that the connection between the separate chamber and the rest of the tank bottom is sealed. The separate chamber then forms a closed housing of the dosing unit. The removable separate chamber may additionally have a cover through which the dosing unit in the separate chamber can be accessed. The separate chamber and the cover of the separate chamber may be fixed in the tank bottom through the use of a common screw connection. It is also possible for the cover to close off the separate chamber through the use of a discrete screw connection. It is then possible for the separate chamber, as a self-contained dosing system with a housing formed by the separate chamber, to be removed from the tank bottom. If the separate chamber is removable from the tank bottom, the opening in the tank bottom can be used for cleaning the tank.

In accordance with yet a further feature of the invention, the separate chamber can be fixed in the tank bottom through the use of at least one click connection. A click closure is to be understood, in particular, to mean an SAE flange.

In this embodiment, the chamber may be fastened or fixed in the tank bottom through the use of an SAE flange and/or a click closure. In this case, the chamber is preferably formed as a pot which has the corresponding closure. The matching counterpart to the closure may be injection-molded into the tank bottom. The leak-tightness of the connection between the chamber and the tank bottom can thus be attained, wherein at the same time it is ensured that the chamber can be mounted in the tank bottom easily.

In accordance with yet an added feature of the invention, the tank bottom is produced from plastic and the separate chamber is formed as a pot which is non-detachably inserted into the tank bottom. A non-detachable connection between the pot and the tank bottom is to be understood, in particular, to mean that the connection is constructed in such a way that it cannot be released without destruction and/or restored again thereafter, that is to say it involves material damage to the pot and/or tank bottom. The pot is preferably injection-molded into the tank bottom, in particular if the tank is an injection-molded part composed of plastic. The pot may, however, be welded, soldered, brazed and/or cast into the tank bottom. The pot is advantageously cast-in if the tank or the tank bottom is a cast part. A welded-in pot is particularly expedient, for example, if the plastic material of which a tank produced from plastic is composed has already hardened by the time at which the pot is inserted or mounted. A pot can then no longer be injection-molded-in or cast-in. It is, however, possible for the plastic material to be partially melted again during the course of a welding process in order to connect a pot to the plastic material of the tank bottom in a non-detachable manner. In the case of a soldering or brazing process, the pot is connected to the tank with the aid of an additional material, for example a solder or brazing material.

The tank bottom and the pot may be connected in a form-locking manner (prevention of a relative movement between two parts by the engagement of correspondingly formed shaped elements into one another, for example the engagement of teeth into correspondingly formed tooth spaces) and/or cohesive manner (connections in which the parts are held together by atomic or molecular forces, for example by adhesive bonding, soldering, brazing, welding). In order to improve the connection, the pot may have a special, for example roughened, surface at least in regions.

In accordance with yet an additional feature of the invention, it is advantageous for the non-detachably inserted pot to be at least partially metallic. A metallic pot permits very good heat conduction between the interior of the pot and the tank interior.

In accordance with again another feature of the invention, an O-ring is provided, for sealing, on the pot which is injection molded into the tank bottom.

The injection-molded pot is preferably metallic. The tank bottom is preferably composed of plastic. The metallic walls of the pot or of the chamber should be covered only in regions by the plastic of the tank bottom, so that reducing agent stored in the tank is in contact with the metallic walls of the pot. If appropriate, an O-ring may additionally be jointly injection molded. The O-ring ensures the leak-tightness of the connection between the pot or chamber and the tank bottom. Additionally, in the region of the pot, an O-ring may be injection molded on the tank bottom, at which O-ring a cover seals off the closure of the pot.

In accordance with again a further feature of the invention, the separate chamber has a melting heater which extends away from the tank bottom. A melting heater of this type preferably extends over the height of the tank, for example as far as the tank cover. At sufficiently low temperatures, the liquid reducing agent may freeze. After the restart of the system, it is now sought to quickly melt an adequate amount of reducing agent and keep it ready for dosing, or deliver it. In the case of thawed reducing agent being extracted close to the tank bottom, however, there is the risk that the heating power is not sufficient to penetrate directly into the upper region of the tank. Consequently, a type of "ice cavity" may form in which a negative pressure may arise due to the delivery of already-thawed reducing agent. If a melting heater which extends away from the tank bottom is now provided in the separate chamber, it is possible through the use of the melting heater for an opening to be melted in the closed ice ceiling, through which opening a pressure equalization takes place. If the melting heater extends over the entire height of the tank, an opening can be melted in an ice ceiling situated at any height. A reliable provision of liquid reducing agent is thus possible even when ice is present in the reducing agent tank. The melting heater is preferably in the form of a bar heater, wherein one or more (electrically heatable) bar heaters extend from the separate chamber to the tank cover.

In accordance with again an added feature of the invention, it is advantageous for the separate chamber to have at least one heater. The at least one heater is preferably disposed in the separate chamber. The heater may be fastened directly to the wall of the chamber, in such a way that there is areal heat-conducting contact between the heater and the wall of the chamber. In addition or alternatively, the tank heater may also be connected in heat-conducting fashion to the wall through heat-conducting devices. The heat-conducting devices may, for example, be composed of a material with good heat-conducting properties. Heat-conducting devices which include aluminum, for example, are particularly advantageous.

The heater is preferably provided within the separate chamber. It is alternatively or additionally also possible for a heater to be provided outside the separate chamber in the tank interior. Such a heater may, for example, be in the form of a heating coil which runs around the separate chamber. Such a heater outside the separate chamber may be operated either electrically or with a heating liquid. Cooling water of the internal combustion engine of a motor vehicle may be used as heating liquid. A heater provided outside the separate chamber may be fastened to the separate chamber. Such a heater is preferably fastened only to the separate chamber. The heater may be installed into the tank jointly with the separate chamber.

It is advantageous, in particular, for an upper wall of the separate chamber to have a heater. The upper wall of the separate chamber divides the chamber from the tank interior. A heater disposed there can heat both the tank interior as well as the separate chamber with the dosing unit. At the same time, relatively low heat losses arise because the upper wall of the separate chamber is at a particularly great distance from an outer side of the device according to the invention. It is thus possible in the tank interior for the frozen reducing agent in the direct vicinity of the dosing system to be thawed, and a fast provision of liquid reducing agent through the use of the dosing system is made possible.

It is also particularly advantageous for the at least one heater to be connected in heat-conducting fashion to a base plate. The heat-conducting connection between the heater and the base plate may likewise be formed through the use of direct contact and/or by a heat-conducting device, wherein the explanations given above regarding a heat-conducting device are referred to in their entirety herein. The individual components of a dosing unit are then in heat-conducting contact with the heater through the base plate. The heat-conducting connection between the heater and the base plate may also be produced indirectly through the wall of the chamber. The heat-conducting connection from the heater to the wall may likewise be formed indirectly through the base plate.

In accordance with again an additional feature of the invention, it is furthermore advantageous for the reducing agent tank to be formed from plastic and to have at least one opening which is provided with a metallic sleeve. Plastic is the preferred material for the reducing agent tank because plastic tanks are particularly light in weight and the production of plastic tanks is particularly inexpensive. Metallic surfaces can, however, be machined with significantly greater precision than plastic surfaces. The sealing surfaces at openings in the reducing agent tank must generally be particularly flat. Metallic sleeves at the openings make it possible to provide such particularly flat surfaces on a reducing agent tank composed of plastic. The metallic sleeves may, for example, be embedded, cast, welded or the like into the plastic material of the reducing agent tank. It is also advantageous for the openings in the reducing agent tank to be as small as possible. Such metallic sleeves may, for example, be formed with an outer diameter of at most 25 mm [millimeters], preferably at most 10 mm. Realizing leak-tightness at the sealing surfaces becomes more difficult the larger the sealing surfaces are. In this case, the sealing surfaces between a plastic material of the wall or of the base of the reducing agent tank and the metallic sleeve are a particular problem. The metallic sleeve and the plastic material have different coefficients of thermal expansion which, together with the temperature fluctuations that occur during operation, can result in leaks. In the case of a device in which the wall of the tank bottom forms the top side of the separate chamber, it is possible to provide particularly small sealing surfaces because only the throughflow ducts from the tank interior to the dosing unit are provided as openings in the reducing agent tank. It is preferable for the largest opening in the reducing agent tank to have a diameter of at most 50 mm, preferably at most 10 mm and particularly preferably at most 5 mm. Furthermore, the reducing agent tank may be constructed in such a way that only openings with a diameter of smaller than 10 mm, preferably smaller than 5 mm and particularly preferably smaller than 2 mm need to be provided in the region of the tank bottom.

In accordance with still another feature of the invention, it is also particularly advantageous if a stone chip guard is provided on the device below the separate chamber.

A stone chip guard is intended to protect the interior of the separate chamber against stone chips from the outside. This may be achieved by virtue of the cover of the separate chamber being suitably formed with a stone chip guard. If appropriate, an additional stone chip guard may also be provided below the cover. The reducing agent tank is generally disposed in the vehicle in such a way that the separate chamber is accessible from the underside of the motor vehicle, and no further cover is provided. Stone chips can therefore pass directly to the cover of the separate chamber, and possibly to the connections and outlets for the discharge of the reducing agent. Damage to the connections can be prevented through the use of the stone chip guard proposed herein.

Alternatively or in addition, a bottoming guard may also be provided below the separate chamber. Such a bottoming guard or impact guard protects the connections of the device according to the invention against damage if the motor vehicle bottoms while driving. This may occur, in particular, if the running gear of the motor vehicle compresses. This is a problem, in particular, in the case of the device described herein because the connections, for example the connection for a reducing agent line, are provided on the underside of the tank. The device should be freely accessible in particular also from the underside of the motor vehicle, in order to ensure that, for example, a reducing agent line can be easily mounted on a connection of the device, provided for that purpose. Furthermore, the connections protrude from a device. The risk posed to the connections on the device by bottoming of the motor vehicle may be eliminated in an effective manner by a bottoming guard. The bottoming guard is formed, for example, as a protective plate which covers at least a part of the device in the direction of the outside environment around the motor vehicle. The device with the bottoming guard may consequently be mounted on the underside and/or on the wheel well or arch of a motor vehicle.

Furthermore, an embedded metallic sleeve on an opening in the reducing agent tank is particularly advantageous if the separate chamber or the dosing unit are produced from metal (or with a metallic housing). It can thus be achieved that the reducing agent tank in the region of the opening and the separate chamber and/or the dosing unit have a substantially uniform coefficient of thermal expansion.

It is also possible for a flat metallic ring to be embedded in the tank bottom, to which metallic ring the separate chamber is fastened through a closure ring. In this case, too, the separate chamber is preferably metallic. A metallic ring differs from a metallic sleeve in that a sleeve at least partially has a cylindrical form, and a metallic ring within the context of the present invention has a substantially flat form. The metallic ring is preferably a disk which has an opening into which the separate chamber can be inserted.

In accordance with still a further feature of the invention, it is advantageous for the tank bottom to have a main plane and for the separate chamber to be disposed above the main plane. A main plane generally means a planar surface in or directly on which the major part of the tank bottom is disposed, and as far as which the tank interior at least partially extends. If the separate chamber is disposed above the main plane, the tank bottom has no or only few regions which protrude downward beyond the main plane, in such a way that the dimensions of the device are defined substantially by the dimensions of the reducing agent tank. The extraction point of the dosing unit for the reducing agent should likewise be disposed in the vicinity of the main plane in order to ensure that the reducing agent tank can be emptied as completely as possible during operation.

In accordance with still an added feature of the invention, it is also advantageous for the tank bottom to have a main plane, for the dosing unit to have a reducing agent outlet, and for the reducing agent outlet to end at a height of less than 50 mm, preferably less than 40 mm and particularly preferably less than 30 mm below the main bottom plane. A reducing agent line, through which the dosing unit delivers the reducing agent to an injector, may be connected to the reducing agent outlet. The injector conducts the reducing agent to an exhaust-gas treatment component. The reducing agent outlet of the dosing unit is preferably realized in the downward direction.

The reducing agent outlet is preferably realized as a connecting piece to which the reducing agent line can be connected. The connecting piece (for example in the form of a protruding pipe end) may have a smooth or corrugated surface (or circumferential surface) to which the reducing agent line can be connected in a fluid-tight manner. The connecting piece is preferably metallic and is connected in heat-conducting fashion to a metallic base plate of the dosing unit. bit is thus possible for heat to be transmitted from a (single) dosing unit system heater to the metallic connecting piece. The reducing agent outlet and the base plate may be formed in one piece. The heat transfer between the base plate and the reducing agent outlet is then particularly effective. It is also possible for the reducing agent outlet to be connected to the base plate through the use of an adhesive with particularly good heat-conducting properties.

With the objects of the invention in view, there is concomitantly provided a motor vehicle, comprising an internal combustion engine, an exhaust-gas treatment system having an injector for reducing agent, a device according to the invention, and a reducing agent line connecting the injector to the device.

Other features which are considered as characteristic for the invention are set forth in the appended claims, noting that the features specified individually in the dependent claims may be combined with one another in any desired technologically meaningful way and highlight further embodiments of the invention.

Although the invention is illustrated and described herein as embodied in a device for providing a liquid reducing agent and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
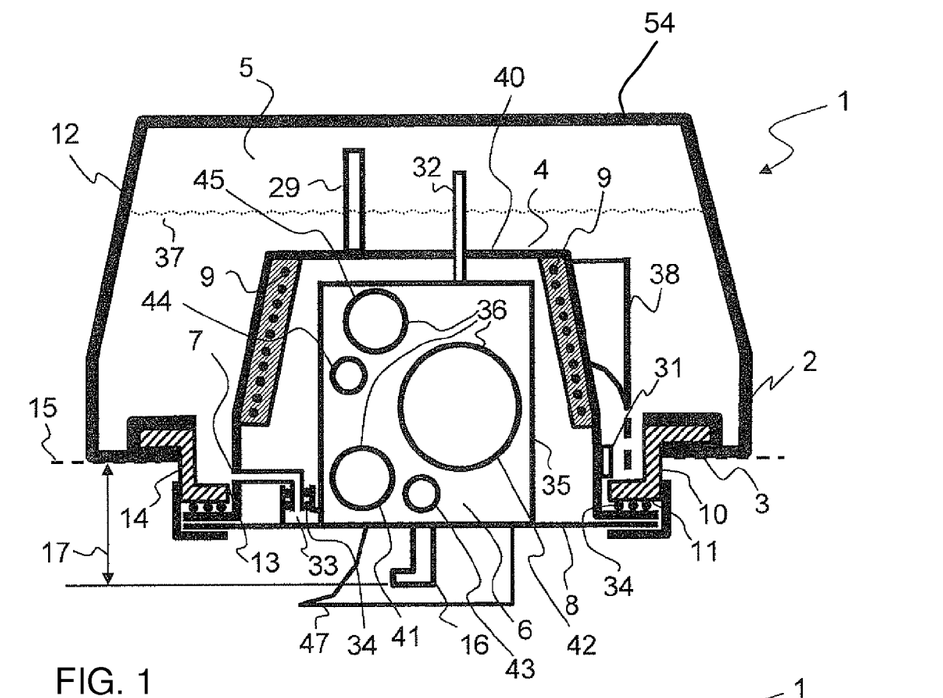
FIG. 1 is a diagrammatic, vertical-sectional view of a first structural variant of a device according to the invention.
Figure 2:
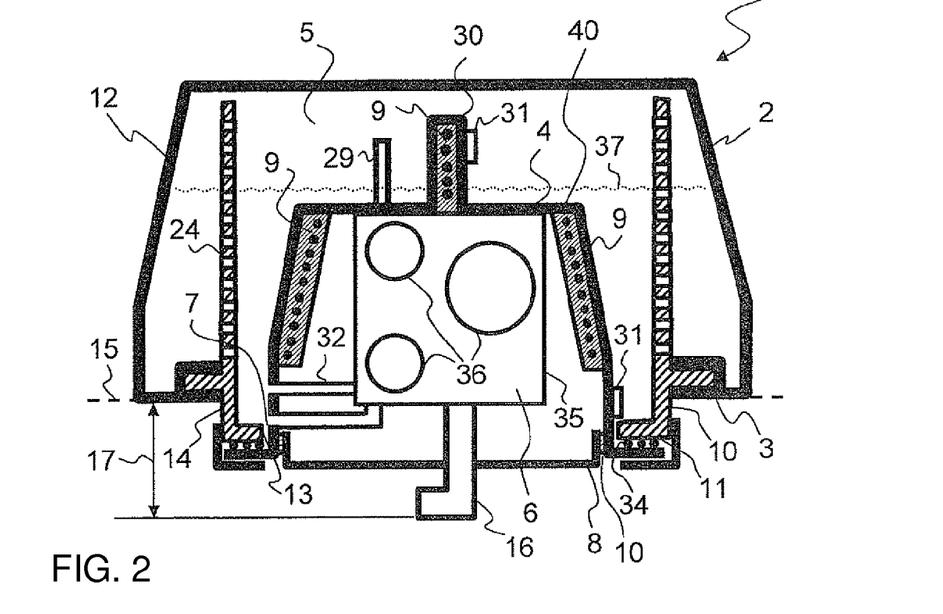
FIG. 2 is a vertical-sectional view of a second structural variant of the device according to the invention.
Figure 3:
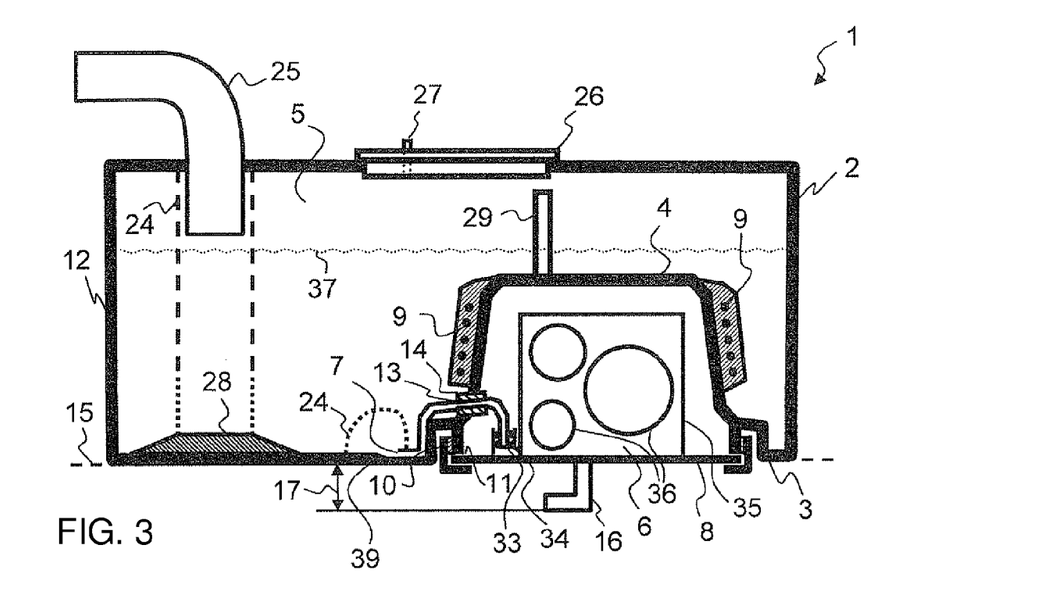
FIG. 3 is a vertical-sectional view of a third structural variant of the device according to the invention.

Referring now in detail to the figures of the drawing for explaining the invention and the technical field in more detail by showing particularly preferred structural variants to which the invention is not restricted, while noting that the figures and, in particular, the illustrated proportions are merely diagrammatic, and first, particularly, to FIGS. 1, 2 and 3 thereof, there are seen three different respective structural variants of a device 1 according to the invention, in which the structural variants partly have components in common denoted by the same reference numerals and in which those components will be described first herein.

The devices 1 in FIGS. 1, 2 and 3 in each case have a reducing agent tank 2 with a tank bottom 3 and a tank interior 5, in which the reducing agent (for example aqueous urea solution, which is liquid under normal conditions) is stored. The reducing agent tank 2 in each case includes a tank wall 54 which delimits the tank interior 5 and which, inter alia, also forms the tank bottom 3. A dosing or metering unit 6 is disposed in a separate chamber 4 provided, by way of example, in the tank bottom 3 in each case. The tank bottom 3 has a main bottom plane 15 in each case. The dosing unit 6 has a reducing agent outlet 16 in each case which emerges at a height 17 below the main bottom plane 15. In this case, the main bottom plane 15 forms a contact surface on which the reducing agent tank 2 rests, in particular when corresponding cutouts are provided in a support surface in the region of the separate chamber 4. The height 17 should, where possible, not exceed 50 mm. The dosing unit 6 in each case has a base plate 35 on which various components 36 are (pre-) mounted. The components 36 may, for example, be valves, filters, pumps, pressure sensors, temperature sensors or similar components which are expedient in the dosing unit 6 for providing liquid reducing agent at a defined pressure at the reducing agent outlet 16. An extraction point 7 for the extraction of reducing agent from the reducing agent tank is provided in each case in the vicinity of the tank bottom 3.

The components 36 may be mounted in the separate chamber 4 on the base plate 35. This is shown, for example, in FIGS. 1, 2 and 3. In addition or, if appropriate, alternatively, it is also possible for corresponding mounting points for the individual components 36 to be provided in the separate chamber 4 on the walls of the separate chamber 4. An efficient exchange of heat between the tank interior 5 and the components 36 of the dosing unit 6 is thus attained, if necessary.

A stone chip guard 47 is provided, in FIG. 1, below the separate chamber 4 on the tank bottom 3 in the region of the reducing agent outlet 16. The reducing agent outlet 16 can be protected against stone chips from below in an effective manner through the use of the stone chip guard 47. The stone chip guard 47 may be fastened to the separate chamber 4 or to the tank bottom 3. The stone chip guard 47 may also be removable.

The dosing unit 6 is mounted in the separate chamber 4 differently in each case in FIGS. 1 and 3.

FIG. 1 shows, by way of example, the different components 36 of the dosing unit 6 of the device 1 according to the invention, in more detail. A pump 41, a filter 42, a pressure sensor 43, a temperature sensor 44 and a valve 45 are provided as the components 36 in this case.

FIG. 1 shows that the dosing unit 6 is fastened to a cover 8 with which the separate chamber 4 can be closed off from below. A top side of the separate chamber 4 is formed by an insert 40. The cover 8 and the insert 40 are fastened in an opening 13 of the reducing agent tank 2 through the use of a screw connection 10. In order to make the reducing agent tank 2 fluid-tight, the opening 13 of the reducing agent tank is provided with a sealing surface 11 in such a way that the insert 40 is sealed off against the sealing surface 11 by O-rings 34. The sealing surface 11 in the reducing agent tank 2 is realized through the use of a metallic sleeve 14 embedded in the reducing agent tank 2.

The connection between a tank composed of plastic and a metallic sleeve or a metallic ring is fluid-tight if the metallic sleeve or the metallic ring is jointly cast or fused into the plastic of the tank.

In FIG. 2, the configuration of the dosing unit 6 in the separate chamber 4 is realized in a similar way. In this case, too, the separate chamber 4 is closed off in the downward direction by a cover 8. A top side of the separate chamber 4 is formed by an insert 40. The dosing unit 6 is fastened to the insert 40. The cover 8 is screwed into the insert 40 at an additional screw connection 10. No sealing surface is provided therein. In this case, the cover 8 must merely ensure sealing against the ingress of spray water from the outside into the separate chamber 4. The sealing of the cover 8 as per FIG. 2 has no influence on the leak-tightness of the tank interior 5 with regard to leakage of reducing agent. The insert 40 is inserted through the use of the screw connection 10 into an opening 13 of the reducing agent tank 2. In this case, too, a sealing surface 11 is provided for sealing the insert 40 and the reducing agent tank 2 with respect to one another, wherein the sealing is realized through the use of O-rings 34. As in FIG. 1, a metallic sleeve 14 is embedded into the reducing agent tank 2 in order to be able to realize the sealing surface 11 in a particularly advantageous manner.

FIG. 3 shows another concept for the construction of the separate chamber 4 and the configuration of the dosing unit 6. In this case, the upper wall of the separate chamber 4 is formed continuously in one piece as a direct constituent part of the tank bottom 3 that is connected cohesively to the tank bottom 3. Such a tank bottom 3 may, for example, be produced from a single-piece starting material through the use of a deep-drawing process. The separate chamber 4 forms, in effect, an indentation of the tank bottom 3 into the tank interior 5. A screw connection 10 and a sealing surface 11 run all the way around the indentation. The separate chamber 4 can be closed off through the use of a cover 8 at the sealing surface 11 and at the screw connection 10. In this case, too, it is necessary merely to ensure sealing against the ingress of spray water from the outside into the separate chamber 4. The sealing of the cover 8 as per FIG. 3 has no influence on the sealing of the tank interior 5 against a leakage of reducing agent. The dosing unit 6 is connected to the cover 8. When the cover 8 is removed from the reducing agent tank 2, the dosing unit 6 with its components 36 is accessible. The only passage out of the tank interior 5 of the reducing agent tank 2 in the region of the tank bottom 3 in this case is the opening 13 through which reducing agent passes out of the tank interior 5 into the dosing unit 6. The opening 13 may be formed with a very small diameter. It is also possible for the opening 13 of the reducing agent tank 2 to be formed with a metallic sleeve 14. The diameter of the opening 13 may be so very small that the leak-tightness can be realized in a particularly simple manner in this case.

In the structural variants according to FIGS. 1 and 3, in each case a coupling 33 is provided which serves to produce a connection between the tank interior 5 and the dosing unit 6 when the dosing unit 6 is inserted into the separate chamber 4. The coupling 33 is preferably also formed with O-rings 34. All three structural variants according to FIGS. 1 to 3 also have tank heaters 9 which are preferably provided on the top side of the separate chamber 4 between the tank interior 5 and the separate chamber 4. As a special feature, FIG. 2 illustrates a melting heater 30. A melting heater 30 is a tank heater 9 which extends upward away from the tank bottom 3. It is preferable for a melting heater 30 to extend over (almost) the entire height of the tank interior 5.

FIGS. 1 to 3 also show different variants of the way in which a return line 32 can be guided out of the dosing unit 6 and back into the tank interior 5. FIG. 1 shows that the return line 32 is guided so as to end in the upper region of the tank interior 5. Air bubbles are often delivered out of the dosing unit 6 through the return line 32. For this reason, it may be advantageous for the return line 32 to end in the upper region of the tank interior 5. FIG. 2 illustrates a variant in which the return line 32 opens out further down into the tank interior 5. The device according to FIG. 3 has no return line 32.

In a dosing unit 6, the return line 32 is normally provided with an electrically adjustable return valve which has an open state and a closed state. When the return valve is closed, reducing agent is provided at a defined pressure. When the return valve is open, reducing agent is conveyed in a circuit through the dosing unit 6 and back into the reducing agent tank 2. It is thus possible for air bubbles to be conveyed out of the dosing unit 6 in an efficient manner. It is preferable for the return valve to be constructed so as to be closed when no electrical current is supplied to it. This feature may also be realized, independently of the other features of the device according to the invention, in a dosing unit 6 for a reducing agent or in an SCR dosing system.

Furthermore, FIGS. 1 to 3 show different possibilities for the determination of a fill level 37 in the reducing agent tank. FIGS. 1 to 3 each illustrate a bar electrode 29 which is mounted on the separate chamber 4 in the tank interior 5 and through the use of which a continuous fill level determination is possible at least in a fill level range. The bar electrode 29 may also be mounted on the side of the separate chamber 4 in the tank interior 5. Furthermore, in FIGS. 1 and 2, spot electrodes 31 are provided through which a punctiform fill level determination can be realized. The fill level may, if appropriate, be determined by integration of the consumption between the different fill levels 37 determined in punctiform fashion. The bar electrodes 29 or spot electrodes 31 may be protected by baffle plates 38 in the reducing agent tank. This may be advantageous, in particular, if ice is present in the reducing agent tank 2.

With regard to the device 1, it must be noted that particles may be present in the reducing agent and that those particles must not pass into the dosing unit 6 since they could lead to damage to the components 36 of the dosing unit 6. The particles may be contaminants of any type. This is a problem in the case of a dosing unit 6 disposed on the tank bottom 3 because, in this case, particles can pass into the dosing unit 6 particularly easily. For this reason, FIGS. 2 and 3 illustrate different concepts for protecting the dosing unit 6 and the components 36 against such particles.

FIG. 2 shows that a screen 24 is provided on the metallic sleeve 14 at the opening 13 into which the dosing unit 6 is inserted. The screen 24 divides the tank interior 5 into an inner region, which surrounds the dosing unit 6 and the separate chamber 4, and an outer region. Particles located in the outer region thus cannot pass into the inner region around the separate chamber 4 and the dosing unit 6.

FIG. 3 shows that a screen 24 is provided in the direct vicinity of a depression 39. The reducing agent is extracted from the depression 39. The screen 24 may, for example, be disposed as a dome-shaped structure over the depression 39. In this case, as a further concept, a screen 24 is provided in the vicinity of a replenishment line 25 through which reducing agent can be replenished into the reducing agent tank 2. It is thus possible to prevent particles which are delivered in the reducing agent during the replenishment process from distributing in the tank interior 5. It is also possible in this case for a pedestal 28 to be provided in the vicinity of the screen 24, in such a way that reducing agent which is replenished through the replenishment line 25 can pass particularly easily through the screen 24 into the rest of the tank interior 5.

In the embodiment according to FIG. 3, a tank cover 26 is additionally provided in order to permit cleaning of the reducing agent tank. A tank vent 27 may also be provided in the tank cover 26. In the structural variant according to FIG. 3, a tank cover 26 is particularly advantageous because the reducing agent tank 2, due to the special construction of the separate chamber 4 in this variant, does not have any further relatively large opening 13 through which cleaning of the tank interior 5 could be carried out.

Figure 4:
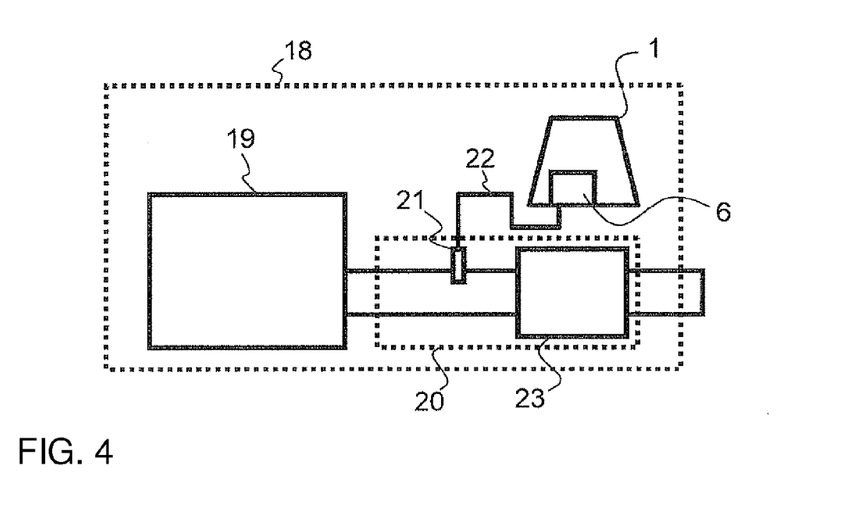
FIG. 4 is a longitudinal-sectional view of a motor vehicle having a device according to the invention.

FIG. 4 shows a motor vehicle 18 having an internal combustion engine 19 and an exhaust-gas treatment system 20. An SCR catalytic converter 23 is provided in the exhaust system 20. Liquid reducing agent is supplied through an injector 21 to the exhaust system 20 from a device 1 according to the invention having a dosing unit 6. The device 1 according to the invention and the injector 21 are connected to one another through a reducing agent line 22.

Figure 5:
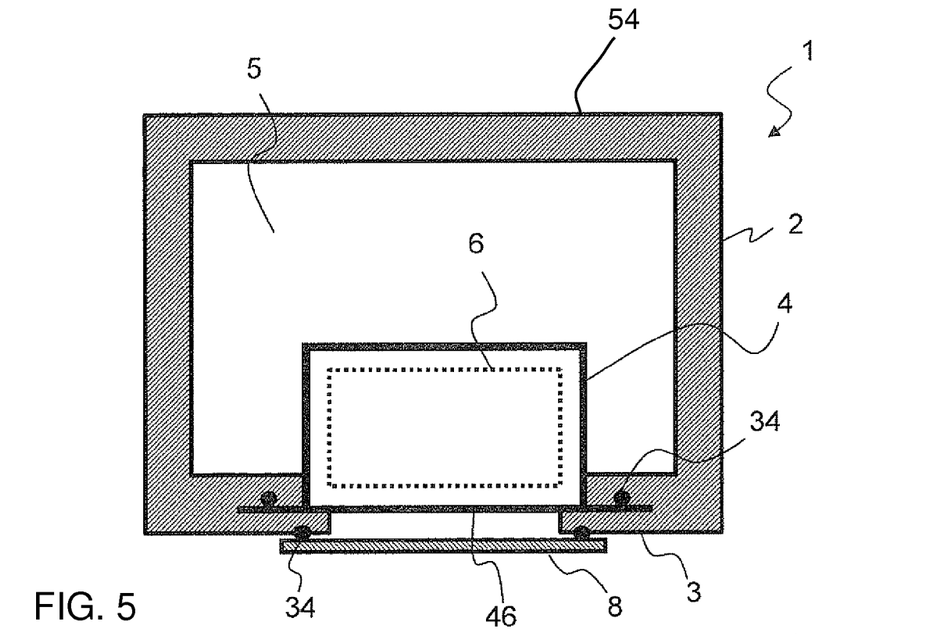
FIG. 5 is a vertical-sectional view of a fourth structural variant of the device according to the invention.

FIG. 5 shows a structural variant of the device 1 according to the invention in a highly simplified diagram, in which the separate chamber 4 is in the form of a pot 46 which is non-detachably connected to the tank bottom 2 of the reducing agent tank 3. The pot is preferably injection molded, cast, soldered, brazed or welded into the tank bottom 3 of the reducing agent tank 2 or into the tank wall 54 of the reducing agent tank 2 in the region of the tank bottom 3. In this case, the reducing agent tank 2 is preferably produced from plastic. The pot 46 is preferably metallic. In this structural variant, too, the dosing unit 6 is provided in the separate chamber 4, with the dosing unit being indicated in this case as a box with dashed lines. The pot 46 may be closed off by a cover 8. The sealing of the pot 46 and the tank bottom 3 with respect to one another may be realized through the use of injection-molded O-rings 34, in such a way that it is not possible for reducing agent to seep along the pot 46 through the tank bottom 3 and out of the tank interior 5. Furthermore, O-rings may be injection molded into or onto the tank bottom 3 in the region of the pot 46. Those O-rings permit sealing of the cover 8 on the tank bottom 3.

Figure 6:
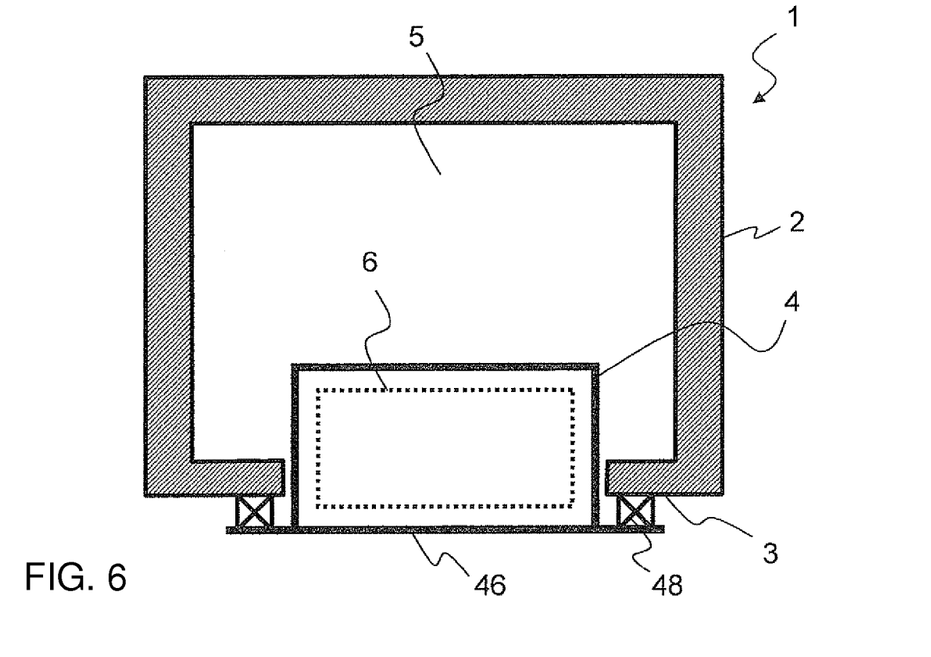
FIG. 6 is a vertical-sectional view of a fifth structural variant of the device according to the invention.

FIG. 6 shows a further structural variant of the device according to the invention, in which the separate chamber 4 can be removed from the tank bottom 3 of the reducing agent tank 2. In this case, the separate chamber 4 is likewise formed as a pot 46. The fixing or fastening of the separate chamber 4 or of the pot 46 in the tank bottom 3 is realized through the use of an SAE flange 48. Secure sealing of the tank interior 5 is likewise possible through the use of the SAE flange 48. In this structural variant, too, the dosing unit 6 is provided in the separate chamber 4, with the dosing unit being indicated in this case as a box with dashed lines.

Figure 7:
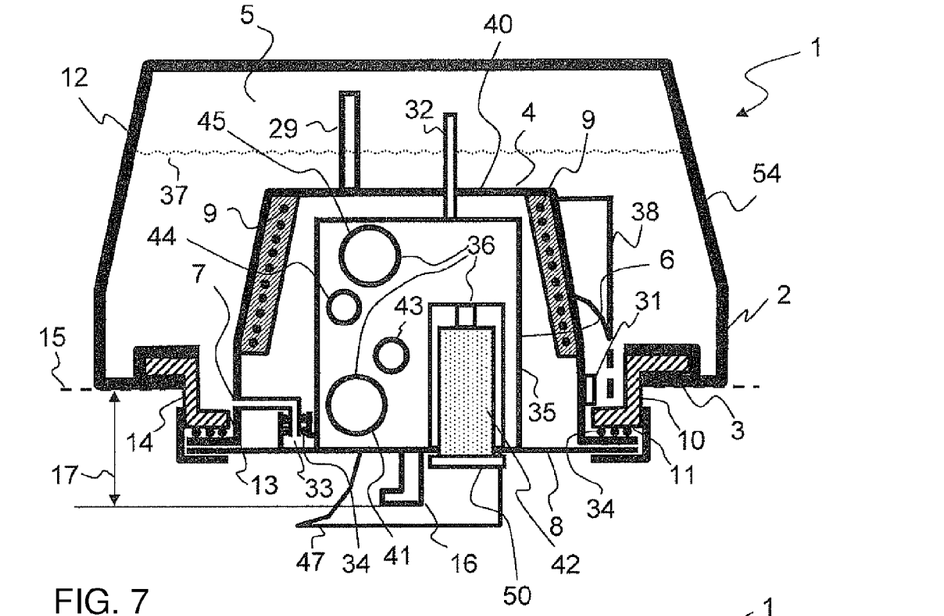
FIG. 7 is a vertical-sectional view of a sixth structural variant of the device according to the invention.

FIG. 7 shows a modification of the illustration in FIG. 1. In FIG. 7, the filter 42 is formed as a removable (exchangeable) cartridge 50. The cartridge 50 can be removed from the dosing unit 6 in the downward direction. The dosing unit 6 and the cartridge 50 preferably each have coupling devices which (automatically) close off both the cartridge 50 as well as the dosing unit 6 in a fluid-tight manner when the cartridge 50 is removed from the dosing unit 6. When the cartridge 50 is inserted into the dosing unit 6, the automatic coupling devices then produce at least one fluidic connection between the cartridge 50 and the dosing unit 6. It can thus be ensured that reducing agent does not escape either from the dosing unit 6 or from the cartridge 50 when the cartridge 50 is removed from the dosing unit 6.

In the device 1, there may also be provided a chamber in which the cartridge 50 with the filter 42 may be disposed. The cartridge 50 may also be formed without the coupling devices described further above. The filter 42 may then be disposed openly in the chamber or the cartridge 50. An escape of reducing agent is then generally unavoidable when the cartridge 50 is removed from the device 1. On the other hand, a considerably less expensive cartridge 50 may be used which does not have any of the described coupling devices and which is composed substantially only of the filter 42. The filter 42 inserted in such a device is preferably a standardized component.

The chamber for the cartridge 50, or the filter 42, according to FIG. 7 can preferably be closed off by a separate cover element. That cover element can be non-destructively detached for the installation of the filter in and/or removal of the filter from the device 1.

Figure 8:
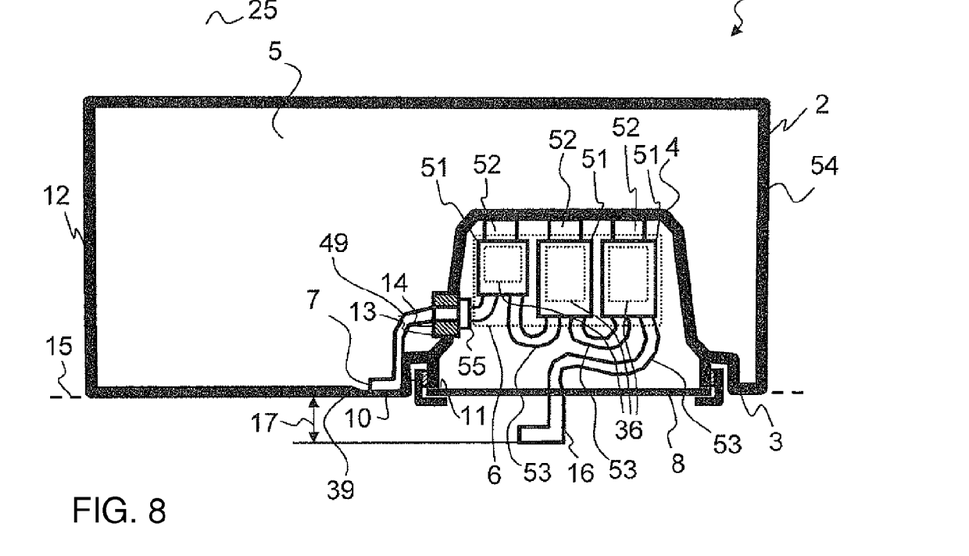
FIG. 8 is a vertical-sectional view of a seventh structural variant of the device according to the invention.

The device 1 illustrated in FIG. 8 is a modified structural variant of the device illustrated in FIG. 3. The separate chamber 4, containing the dosing unit 6, in the reducing agent tank 2, is constructed as shown in FIG. 3. In this case, the upper wall of the separate chamber 4 is formed continuously as a direct constituent part of the tank bottom 3 which is connected cohesively to the tank bottom 3. Such a tank bottom 3 may, for example, be produced from a single-piece starting material through the use of a deep-drawing process. The separate chamber 4 thus forms a type of indentation of the tank bottom 3 extending into the tank interior 5. There may be a screw connection 10 and a sealing surface 11 running all the way around the indentation. The separate chamber 4 can be closed off through the use of a cover 8 at the sealing surface 11 and at the screw connection 10. In this case, too, it is necessary to merely ensure sealing against the ingress of spray water from the outside into the separate chamber 4. The sealing of the cover 8 according to FIG. 8 has no significant influence on the sealing of the tank interior 5 against a leakage of reducing agent.

In FIG. 8, the dosing unit 6 is composed of individual modules 51 which are fastened to the tank bottom 3 at mounting points 52. The modules 51 each include the components 36 of the dosing unit 6. The modules 51 may, for example, include at least one filter module, at least one pump module and at least one sensor module. The dosing unit 6 can thus be configured in a manner suited to the respective application. For example, if particularly heavily contaminated reducing agent is used, an additional filter module may be added. If the delivery capacity must be increased for an application, an additional pump module may be added. The individual modules 51 may be connected to one another by line portions 53. A construction of this type also ensures that individual modules 51 can be exchanged.

When the cover 8 is removed from the reducing agent tank 2, the dosing unit 6 with its components 36 is accessible. The only passage out of the tank interior 5 of the reducing agent tank 2 in the region of the tank bottom 3 is the opening 13 through which reducing agent passes out of the tank interior 5 into the dosing unit 6. That opening 13 may be formed with a very small diameter. It is preferable for the opening 13 of the reducing agent tank 2 to be formed with a metallic sleeve 14. The metallic sleeve 14 preferably has a diameter of less than 25 mm and is embedded in a fluid-tight manner into the tank bottom. The metallic sleeve 14 may be formed with an adapter port 55 to which the individual modules 51 of the dosing unit 6 can be connected.

In particular, in the case of a device of this type, the separate chamber 4 may also be disposed on the top side of a reducing agent tank 2 or on a side wall of a reducing agent tank 2.

For example, it is preferable for a device 1 for providing liquid reducing agent to have a reducing agent tank 2 for storing reducing agent. The reducing agent tank has a tank wall 54 and a separate chamber 4 which is formed with a dosing unit 6 for extracting reducing agent from the reducing agent tank 2. The dosing unit 6 is disposed within the separate chamber 4, and an adapter connection 55 which is provided on the separate chamber 4 can produce a connection through which reducing agent can pass, between a tank interior 5 and the dosing unit 6.

A device 1 of this type is also considered to be capable of protection independently of the features of the patent claims. If the separate chamber 4 is disposed on a side wall or on a top side of a reducing agent tank 2, a correspondingly shaped extraction pipe 49 on the adapter connection 55 can serve to produce a connection between an extraction point 7, which is disposed in the vicinity of the tank bottom 3, and the adapter connection 55.

Figure 9:
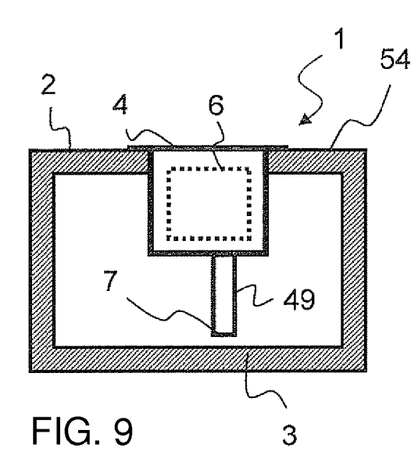
FIG. 9 is a vertical-sectional view of an eighth structural variant of the device according to the invention.
Figure 10:
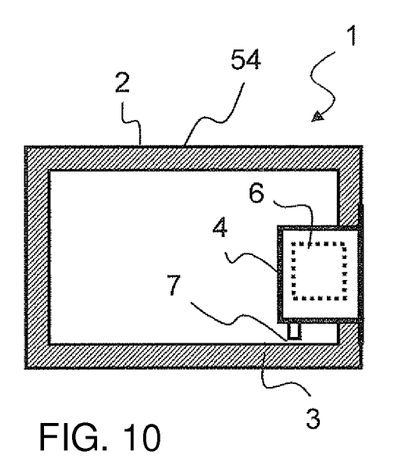
FIG. 10 is a vertical-sectional view of a ninth structural variant of the device according to the invention.

FIGS. 9 and 10 show two further structural variants of the device 1, in which a dosing unit 6 is provided in each case in a separate chamber 4. In FIG. 9, the separate chamber 4 is disposed on a top side of the reducing agent tank 2 in the tank wall 54. In FIG. 10, the separate chamber 4 is disposed on a side wall of the reducing agent tank 2 in the tank wall 54. In both FIGS. 9 and 10, an extraction point 7 for the extraction of reducing agent from the reducing agent tank is provided in each case in the vicinity of the tank bottom 3. In FIG. 9, an extraction pipe 49 is provided for bridging a distance between the extraction point 7 and the separate chamber 4. In the structural variant according to FIG. 10, the distance between the separate chamber 4 and the tank bottom is preferably selected in such a way that no extraction pipe is required for delivering reducing agent from the tank bottom 3 into the separate chamber 4. The shortest distance between the separate chamber 4 and the tank bottom 3 is preferably less than 50 mm [millimeters], in particular less than 20 mm [millimeters] and particularly preferably less than 10 mm [millimeters].

The invention claimed is:

1. A device for providing liquid reducing agent, the device comprising:
   a reducing agent tank configured to store liquid reducing agent, said reducing agent tank having a tank interior and a tank bottom;
   said tank bottom having a main bottom plane and a separate chamber with an extraction point, said separate chamber being disposed in said tank bottom above said main bottom plane;
   said separate chamber being a subvolume not filled with reducing agent, said subvolume of said separate chamber extending from said tank bottom in direction of said tank interior; and
   a dosing unit including a pump disposed within said separate chamber and configured to extract the reducing agent from said reducing agent tank at said extraction point.

2. The device according to claim 1, wherein said dosing unit is detachably connected to said reducing agent tank.

3. The device according to claim 1, wherein said dosing unit has at least one component selected from the group consisting of:
   a filter;
   a pressure sensor;
   a temperature sensor; and
   a valve.

4. The device according to claim 1, which further comprises a cover configured to close off said separate chamber from the environment, said dosing unit being fastened to said cover.

5. The device according to claim 1, wherein said separate chamber is configured to be removed from said tank bottom.

6. The device according to claim 3, which further comprises at least one click closure configured to fix said separate chamber in said tank bottom.

7. The device according to claim 1, wherein said tank bottom is formed of plastic and said separate chamber is formed as a pot non-detachably inserted into said tank bottom.

8. The device according to claim 7, wherein said non-detachably inserted pot is at least partially metallic.

9. The device according to claim 7, which further comprises an O-ring injection-molded into said tank bottom at said pot for sealing.

10. The device according to claim 1, wherein said separate chamber has a melting heater extending away from said tank bottom.

11. The device according to claim 1, wherein said separate chamber has at least one heater.

12. The device according to claim 1, wherein said reducing agent tank is formed with plastic and has at least one opening provided with a metallic sleeve.

13. The device according to claim 1, wherein:
   said tank bottom has a main bottom plane;
   said dosing unit has a reducing agent outlet; and
   said reducing agent outlet ends at a height of less than 50 mm [millimeters] below said main bottom plane.

14. The device according to claim 1, which further comprises a stone chip guard disposed below said separate chamber.

15. A motor vehicle, comprising:
   an internal combustion engine;
   an exhaust-gas treatment system associated with said internal combustion engine and having an injector for reducing agent;
   a device according to claim 1; and
   a reducing agent line connecting said injector to said device.

16. The device according to claim 1, which further comprises a cover configured to close off said separate chamber from the environment.

17. The device according to claim 1, wherein said reducing agent tank has a wall, and said separate chamber has a wall with an upper part formed in one piece with said reducing agent tank wall.

18. The device according to claim 1, wherein said separate chamber has a wall with an upper part formed in one piece with said reducing agent tank bottom.

* * * * *